No. 794,282. PATENTED JULY 11, 1905.
M. DE TAMBLE.
AUTOMATIC CARVING MACHINE.
APPLICATION FILED NOV. 21, 1903.
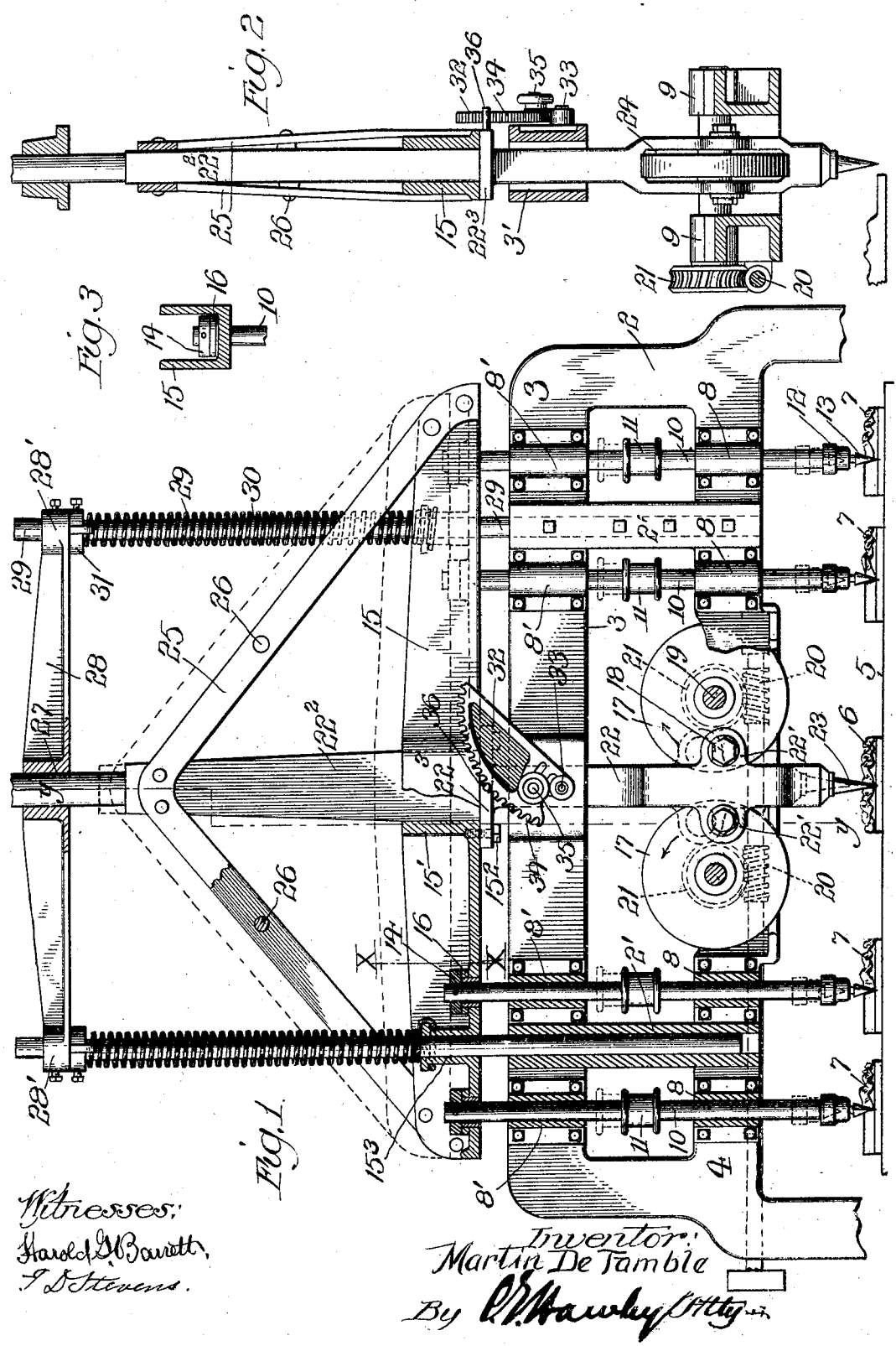
Witnesses:
Harold G. Barrett.
J. D. Stevens.
Inventor:
Martin De Tamble
By C. P. Hawley Atty.

No. 794,282. Patented July 11, 1905.

UNITED STATES PATENT OFFICE.

MARTIN DE TAMBLE, OF INDIANAPOLIS, INDIANA, ASSIGNOR TO UNIVERSAL AUTOMATIC CARVING MACHINE CO., OF CHICAGO, ILLINOIS, A CORPORATION OF NEW JERSEY.

AUTOMATIC CARVING-MACHINE.

SPECIFICATION forming part of Letters Patent No. 794,282, dated July 11, 1905.

Application filed November 21, 1903. Serial No. 182,202.

*To all whom it may concern:*

Be it known that I, MARTIN DE TAMBLE, a citizen of the United States, residing in the city of Indianapolis, county of Marion, and State of Indiana, have invented certain new and useful Improvements in Automatic Carving-Machines, of which the following is a specification.

My invention relates to machines for carving relief and intaglio designs upon wood or other material; and my invention has special reference to improvements upon automatic carving-machines of that class which includes the one that is shown and described in Letters Patent No. 696,382, granted to Streich and Ruehs March 25, 1902.

The object of my invention is to improve the construction and operation of carving-machines, and the particular object of my invention is to improve the construction, arrangement, and mounting of the tracer-bars and cutter-spindles of automatic carving-machines with a view to rendering them more readily and sensitively responsive to the action of the retracting mechanism and the moving pattern wherewith the tracer engages.

The patented machine when equipped with a pattern is capable of simultaneously reproducing a large number of copies or reproductions of the pattern in any suitable material, usually wood. When once adjusted and started, it continues in operation automatically. The work and the pattern are carried upon a feed-table, the principal movement of which is longitudinal, but which also has a transverse or side feed movement. The tracer and the tools operate together, and a retracting mechanism is interposed between the feed-table and the frame of the machine to assist the tracer over prominences in the moving pattern. The tracer comprises the tracer proper, which is a pointed tool, and the tracer-bar, in the lower end of which said tool is secured. In the patented machine the tracer-bar and the cutter-spindles are of substantially the same length, and the upper ends of all are connected by a cross-bar. The lower end of the bar has no corresponding guide or bearing. Instead the retracting mechanism is relied upon to hold the tracer against movement with the pattern. The only movement permitted the tracer is perpendicular to the plane of the pattern. Said retracting mechanism comprises two friction-disks which rotate in opposite directions and which work in conjunction with friction-buttons that are provided on said tracer-bar. These buttons are adjustable. The sides of the disks are in alinement with the upper bearing of the tracer-bar, and in preparing a machine for use said buttons are carefully adjusted to aline the bar with its top bearing and the sides of the disks. Such relation leaves the buttons against the disks and they bear flatly and firmly thereon whatever the elevation of the bar. The tracer-bar owes its operation to the friction between said buttons and said disks, and such friction is occasioned by and varies with the lateral pressure of the moving pattern upon or against the tracer-bar. It is obvious that disalinement of the tracer-bar would result in cramping the bar in said upper bearing and would be aggravated by the raising of the bar, a movement, furthermore, which would cause the friction-buttons to assume angular positions upon the disks, and thus materially reduce the areas of frictional engagement between the buttons and disks, thereby lessening the lifting power of the disks. The top bearing for the bar is close to the tops of the disks, and unless the bar stands exactly plumb it will when raised be thrown quite markedly out of alinement. Thus it happens that in manufacturing the patented machines and placing them upon the market much difficulty and annoyance has been experienced through the changing of the relations of the bar and the disks by the wearing away of the friction-buttons and the sides of the disks. Various expedients have been resorted to to keep the faces of the buttons parallel with the sides of the disks, or, in other words, to keep the tracer-bar plumb. All contrivances applied directly in the locality of or upon the retracting mechanism have failed, and lack of proper alinement has frequently resulted in the sticking or delayed action of the tracer and tools, with damage to the machine and the work therein. To overcome this difficulty is the principal object of this invention, and to such end I have departed from the idea of having the cross-beam form the top of the tracer-bar and have dispensed with the tracer-bar bearing hitherto employed between said beam and the retracting mechanism. Its presence at such point has placed a practical limit upon the utility, durability, and reliability of the machine, for with this bearing as the center of oscillation between the tracing-point and said bearing the shortening of the distance between the buttons and said bearing by the lifting of the bar inevitably aggravates any discrepancy in adjustment or disalinement in the parts.

My invention consists generally in a carving-machine wherein a suitable retracting mechanism is employed and wherein the tracer-bar and the cutter-spindles are, as before, connected by a cross-beam, but in which the tracer-bar is made of great length and is provided with a top bearing or guide at a considerable distance above said cross-beam to minimize the effect of wear in the retracting mechanism.

My invention also consists in means for arbitrarily limiting the drop of the tracer-bar to accord with the work to be done and the position of the feed-table; and, further, my invention consists in various and specific improvements in the construction and operation of automatic carving-machines, all as hereinafter described, and particularly pointed out in the claims.

My invention will be more readily understood by reference to the accompanying drawings, forming a part of this specification, and in which—

Figure 1 is a vertical elevation of the tool-head of an automatic carving-machine embodying and illustrating my invention. Fig. 2 is a vertical transverse section substantially on the line $y\ y$ of Fig. 1, and Fig. 3 is a sectional detail on the line $x\ x$ of Fig. 1.

As shown in the drawings, 2 represents the tool-head of an automatic carving-machine. This is erected upon the base of the machine, and its essential parts are the upper and lower bars or frame parts 3 and 4.

5 represents the table upon which the pattern 6 and the work or panel 7 are secured. Longitudinal movement is imparted to this table by a mechanism in the lower part of the machine, (not shown,) and the same reciprocates automatically. At the end of each reciprocation the table 5 is moved transversely to feed the work to the tools for a fresh cut. No attempt is made herein to show or to claim the mechanism for thus actuating the feed-table, such mechanism being well known. The tool-head stands vertically above the feed-table and crosses the same. Said head, as generally spoken of, comprises the frame 2 with the tracing and cutting tools and the parts connecting the various tools; but for clearness the frame 2 will alone be referred to herein as the "tool-head." The lower portion 4 of the tool-head is provided with bearings or boxes 8 and 9, the latter being at right angles to the former. Upon its upper part the head has corresponding bearings or boxes 8'. The bearings 8 8' contain the vertical cutter-spindles 10, each provided with a belt-pulley 11 between its bearings 8 8', and the same are driven at a high speed. The lower end of each spindle is equipped with a chuck 12 to hold the cutter 13, and the tool-spindles are vertically movable or slidable as well as revoluble in said bearings. The upper end of each spindle is provided with a collar 14, and all of the spindles are suspended from the cross bar or beam 15. This beam is preferably made of wood or of light metal, such as aluminium, and is provided with harder bearings or bushings for the upper ends of the spindles 10. It is obvious that when the beam 15 is raised and lowered the cutting-tools will be correspondingly elevated and permitted to sink into the work or panel 7, and this movement, coupled with the movement of the work by the feed-table, is alone employed for the production of the pattern figures upon the panel. For thus operating the cross-beam 15 and the cutter-spindles hanging therefrom there is employed a tracer and a retracting mechanism, the first being rigidly connected to the cross-beam and the latter being capable of elevating the tracer with the beam and tools joined thereto. In the drawings I have illustrated the retracting mechanism of said patented machine; but this invention is not limited thereto. Such retracting mechanism comprises the disks 17 17 and the friction-buttons 18. The disks 17 are secured to the short horizontal shafts 19, that are held in the bearings 9 and which are driven in opposite directions by the worms and worm-gears 20 21, as shown by dotted lines in Fig. 1. The disks are held against longitudinal movement with respect to their bearings 9 9 and are capable of withstanding lateral pressure upon their sides.

22 represents the tracer-bar, and 23 the tracer-point or tracer proper, which latter rests upon the pattern 6 and as said pattern moves closely follows the sinuosities thereof. Near its lower end the tracer-bar 22 is provided with an opening 24 to receive the adjacent edges of the disk 17, and said lower part is also provided with ears 22', which overlap the disks and contain the friction-buttons 18, four in number. These friction-buttons have their inner ends formed or faced with suitable material and are adjustable in the tracer-bar. The buttons on opposite sides of the disk are turned or adjusted into close contact therewith, and the machine operates best when all of the buttons lie or engage flatly with the sides of the disks. Assuming the presence of a bearing for the upper end of the tracer-bar, it will be obvious that pressure upon the front or back of the tracing-point 23 will operate to force the friction-buttons upon that side more closely or strongly into engagement with the disks. The engaged portions of the disks rotate upwardly, and when the buttons upon the tracer-bar are pressed against them they operate to lift the tracer-bar. The pressure referred to is that which occurs when a prominence in the pattern encounters the tracing-point and the movement imparted to the tracer-bar by the disks, as described, lifts the tracing-point over such a prominence. The wedging force of the reciprocating pattern is thus assisted by a positive power-actuated mechanism which has sufficient strength to raise the tracer-bar, the cross-beam, and all of the cutter-spindles. Gravity is depended upon to return the tracer and the rotating cutters when the tracer encounters a downward incline in the pattern.

It is obvious that to obtain the maximum lifting effect from the retracting mechanism the tracer-bar must be kept parallel with the sides of the disks and that the friction-buttons must not only be constantly held in firm contact with said sides, but must be exactly perpendicular thereto. Exact adjustment of the parts is difficult of attainment, and the wearing thereof cannot be avoided; but I conceive and find that the theoretically proper relations of the parts can be practically maintained and the continuous and reliable operation of the machine insured by increasing the length of the tracer-bar and employing a top bearing therefor at a proportionately great distance from the retracting mechanism. In following out this conception I prefer, as shown in the drawings, to at least double the usual length of the tracer-bar, providing the same with a long extension or upper end $22^2$ above the cross-beam 15. The tracer-bar is preferably an aluminium casting, and the same is provided with a shoulder $22^3$ to support the cross-beam. The cross-beam is preferably provided with integral sleeves $15'$, which fit the tracer-bar, and the beam is rigidly secured to said bar by bolts $15^2$. The two parts are made still more rigid by the light side braces 25. These are thin metal bars which have their lower ends riveted to the ends of the beam 15 and their upper ends riveted or bolted to the upper portion of the tracer-bar.

26 represents braces extending between the bars 25 to stiffen the same. The tracer-bar 22 extends upward through the frame part; but, as shown in Fig. 2, the opening $3'$ therein is much larger than the tracer-bar and the usual bearing at this point is dispensed with. In place thereof a bearing 27 is provided for the extreme upper end of the long tracer-bar. The upper end of said bar may be of any suitable cross-section and slides freely in said bearing 27. This bearing is formed in the arch-bar 28, which may be a metal casting and is provided with bosses $28'$ at its ends to receive the upper ends of the arch columns or posts 29. The columns or posts 29 are set into the sockets or clamps $2'$ of the machine-head and are preferably vertically adjustable therein. Likewise the bar 28 may be adjustable upon the columns. These columns not only support the top bearing for the tracer-bar, but serve to guide the cross-beam 15, which has guide-sleeves $15^3$, that loosely fit the columns. Like the sleeve $15'$, these sleeves $15^3$ are preferably integral parts of the aluminium casting 15. For counterbalancing and sustaining the weight of the cutter-spindles, the beam 15, and the tracer-bar I employ the spiral springs 30, which surround the posts 29 and have their upper and lower ends connected, respectively, to the adjustable collars 31 and the cross-beam 15. These springs sustain the greater part of the weight of the movable elements of the machine and yet permit the tracer and tools to quickly return to the pattern and work after being lifted. It will be observed that the location of the top bearing of the tracer-bar at a great distance from the retracting mechanism and above the tool-head and the employment of a tracer-bar wherein the upper arm is many times the length of the lower arm minimizes the possible angular deflection of the bar in case of wear between the parts of the retracting mechanism. This is true to such an extent that it is no longer necessary to observe the customary exactness in adjusting said mechanism, and my machine will continue to operate well even after the friction-buttons become so worn as to permit the actual oscillation of the lower end of the tracer-bar, a condition, however, which should always be corrected as soon as it is detected. In this manner I overcome the chief difficulty heretofore encountered in machines of the type to which my invention applies.

The feed-table of an automatic carving-machine is usually equipped with work-holders that are vertically adjustable, it being desirable that the work shall be brought as close up to the lower bar of the head as possible. In this way the pattern and work are frequently elevated above the low point of the tracer and tools and there is danger that the same will drop down past the pattern, thereby endangering the tools by the liability of coming in contact with the movable work-holders on table 5, which are usually made of hard material. Consequently the cutters would be ruined if they came in contact with these work-holders. There is also a liability that part of the pattern may have openings and may allow the tracer to drop through these openings beyond the working depth letting the tools into the work beyond their cutting edges, and thereby retarding or stopping their rotation on account of the chucks that hold these tools coming in contact with the work. In that case there would be great liability of either springing, bending, or breaking the cutter-spindles. To correct this fault I provide an adjustable stop in connection with the tracer-bar. This stop comprises the eccentric segment 32, secured to the machine-head by a pivot 33 and provided with a large number of peripheral notches 34. A hand-screw 35 is provided for locking the segment in any of its positions, and the difference between the short radius and the long radius of the segment represents the extreme stroke of the tracer-bar. The tracer-bar is provided with a stop-pin 36 which projects over the stop cam or segment 32 to engage with the same. By placing the stop-cam upright, so that the pin 36 will drop into the upper notch thereof, the movement of the tracer-bar by the retracting mechanism may be limited to a fraction of an inch while in lower positions of the cam greater stroke or throw of the bar will be permitted. The adjustment of the stop-cam to receive the pin 36 in its lowest notch measures the maximum fall and stroke of the tracer and tools. This appliance is directly upon the front of the machine, and by means thereof the operator may adjust the stroke of the tools and prevent their dropping to a dangerous point or level.

The purposes, functions, and operations of my improvements and of the machine as a whole will be understood from the foregoing, and summarization thereof herein is unnecessary.

It is obvious that numerous modifications of my invention will readily suggest themselves to one skilled in the art, and I therefore do not confine the invention to the specific constructions herein shown and described.

Having thus described my invention, I claim as new and desire to secure by Letters Patent—

1. In an automatic carving-machine, the tool-head, in combination with the cutter-spindles arranged therein, a tracer-bar coupled thereto and extending above and below said head, a retracting mechanism guiding the lower end of said tracer-bar and a bearing for the upper end of said tracer-bar above said head, substantially as described.

2. In an automatic carving-machine, the tool-head, the cutter-spindles, revolubly and slidably held in said head and a cross-beam connecting the upper ends of said spindles, in combination with a retracting mechanism arranged in the lower part of said head, a tracer-bar engaged with said retracting mechanism, joined to said cross-beam and extending above said cross-beam and a suitable bearing for the upper end of said bar, substantially as described.

3. In an automatic carving-machine, the tool-head, in combination with a retracting mechanism continuously operated in the lower part thereof, a tracer-bar having its lower end in engagement with said mechanism, means guiding the upper end of said tracer-bar, a cross-beam attached to an intermediate part of said tracer-bar and cutter-spindles depending from said beam, substantially as described.

4. In an automatic carving-machine, the tool-head, the cutter-spindles therein and a cross-beam connecting said spindles, in combination with a power-actuated retracting mechanism, a tracer-bar sustaining said beam and spindles and extending above and below said beam and means guiding the upper end of said tracer-bar, substantially as described.

5. In an automatic carving-machine, a suitable frame or tool-head, in combination with the cutter-spindles mounted therein, the frictional retracting devices arranged in said head, the tracer-bar frictionally engaged with said devices, an arch upon said head, a bearing therein for the upper end of said bar, and suitable means connecting said bar and spindles, substantially as described.

6. In an automatic carving-machine, a suitable frame or head, in combination with an arch erected thereon, a tracer-bar having its upper end guided in said arch, a frictional retracting mechanism provided at the lower end of said bar, a plurality of cutter-spindles provided in said frame and movable with said bar and means partially sustaining the weight of said bar and spindles, substantially as described.

7. In a tracing device for automatic carving-machines, the bar provided with a tracing-point in its end, enlarged and slotted in a portion near said end, having an upper end bearing portion and having beam-securing means intermediate of its ends, substantially as described.

8. A cross-beam for automatic carving-machines, substantially U-shaped in cross-section, provided with spindle-sockets and having integral vertical sleeves at its middle and ends, substantially as described.

9. A cross-beam for automatic carving-machines, comprising a casting of light metal provided with arch-braces extending from its top, and said casting being substantially U-shaped in cross-section and having spindle-sockets in its bottom, substantially as described.

10. In an automatic carving-machine, the tool-head, the spindles therein and the cross-beam connecting said spindles, in combination with a retracting mechanism provided in said head, a tracer-bar, to the middle portion of which said beam is attached and a fixed guide above said beam, wherein the upper end of said tracer-bar is held, substantially as described.

11. In an automatic carving-machine, the frame or head, in combination with the spindles therein, the cross-beam, the tracer-bar extending above and below said cross-beam, the braces extending from the upper portion of said bar to the outer portions of said beam a guide for the upper end of said bar and means for raising said bar, substantially as described.

12. In an automatic carving-machine, the head or frame, in combination with the cutter-spindles mounted therein, a retracting mechanism in said frame, a tracer-bar having parts to engage therewith, means connecting said bar and said spindles, a cross-beam attached to said bar and sustaining said spindles, columns erected on said frame and guiding said bar and a bearing for said bar between the upper ends of said columns, substantially as described.

13. In an automatic carving-machine, the machine-head, in combination with the cutter-spindles mounted therein, a cross-bar connecting the upper ends of said spindles, vertical columns guiding said bar, the sustaining-springs arranged on said columns, a retracting mechanism and a tracer-bar actuated thereby and connected with said beam, substantially as described.

14. In an automatic carving-machine, the head, in combination with the cutter-spindles mounted therein, the tracer-bar, the frictional retracting mechanism for said bar, the cross-beam attached to said bar and sustaining said spindles, the columns upon said head, the tracer-bar bearing provided at the upper ends of said columns and suitable counterbalancing means, for said bar, beam and spindles, substantially as described.

15. In an automatic carving-machine, the head, in combination with the cutter-spindles mounted therein, the retracting mechanism provided in said head, the tracer-bar for operation by said mechanism and connected with said spindles, the elevated bearing for the upper end of said tracer-bar, arranged above said head and adjustable thereon, substantially as described.

16. In an automatic carving-machine, the head, in combination with the spindles mounted therein, the cross-beam connecting said spindles, the columns extending upward from said head, the adjustable supporting-springs thereon for said beam, the bar extending between said columns and provided with a vertical bearing, a tracer-bar having its upper end held in said bearing and attached to said beam and a retracting mechanism provided in the lower part of said head for actuating said bar, substantially as described.

17. In an automatic carving-machine, the head, in combination with the cutter-spindles therein, the tracer-bar parallel with said spindles but projecting above the same, a retracting mechanism arranged at the lower end of said bar, a bearing elevated above said head and holding the upper end of said bar, the cross-beam and the beam and bar braces, substantially as described.

18. In an automatic carving-machine, the tool-head, in combination with the cutter-spindles, the tracer-bar connected with said cutter-spindles, means for retracting said bar and an eccentric stop-segment adjustably secured upon said head for engagement by said bar, substantially as described.

19. In an automatic carving-machine, the frame or head, in combination with the tracer-bar, a retracting mechanism for moving said bar and said head, and the eccentric stop having a notched periphery and adjustably secured upon said frame for determining the stroke of said bar, substantially as described.

20. In an automatic carving-machine, the combination with the frame and the tracer-bar, of a stop pin or lug on said tracer-bar, the notched eccentric stop to receive said pin, and means for adjusting the same to said frame, substantially as described.

In testimony whereof I have hereunto set my hand, this 30th day of October, A. D. 1903, in the presence of two witnesses.

MARTIN DE TAMBLE.

Witnesses:
 HENRY C. BAASE,
 ELIZABETH RAINEY.